(12) United States Patent
Calusinski

(10) Patent No.: US 7,140,027 B2
(45) Date of Patent: Nov. 21, 2006

(54) METHOD AND SYSTEM TO REINITIALIZE OBJECTS WITHOUT LOSING A REFERENCE CONNECTION

(75) Inventor: Jeffrey David Calusinski, West Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 10/076,336

(22) Filed: Feb. 14, 2002

(65) Prior Publication Data

US 2003/0154320 A1 Aug. 14, 2003

(51) Int. Cl.
  G06F 3/00 (2006.01)
  G06F 9/44 (2006.01)
  G06F 9/46 (2006.01)
  G06F 13/00 (2006.01)

(52) U.S. Cl. ..................................................... 719/316

(58) Field of Classification Search ........ 717/168–173, 717/108–116; 719/310, 318, 313–316, 320, 719/328–330
See application file for complete search history.

(56) References Cited

U.S. PATENT DOCUMENTS

| | | | | |
|---|---|---|---|---|
| 4,961,137 A | 10/1990 | Augusteijn et al. | ......... | 364/200 |
| 5,377,350 A | 12/1994 | Skinner et al. | ............. | 395/600 |
| 5,392,432 A | 2/1995 | Engrlstad et al. | ........... | 395/700 |
| 5,794,030 A | 8/1998 | Morsi et al. | ................. | 395/614 |
| 5,920,725 A * | 7/1999 | Ma et al. | ..................... | 717/171 |
| 5,923,877 A | 7/1999 | Berner et al. | ................ | 395/703 |
| 6,138,127 A | 10/2000 | Pasch | .......................... | 707/206 |
| 6,173,336 B1 | 1/2001 | Stoeckl et al. | .............. | 709/315 |
| 6,795,967 B1 * | 9/2004 | Evans et al. | ................. | 719/310 |
| 2001/0032039 A1 * | 10/2001 | Burson | .......................... | 701/3 |
| 2003/0028682 A1 * | 2/2003 | Sutherland | .................. | 709/315 |

* cited by examiner

Primary Examiner—William Thomson
Assistant Examiner—Diem Cao
(74) Attorney, Agent, or Firm—David A. Mims, Jr.; Darcell Walker

(57) ABSTRACT

The present invention is a method and system that enables reference processes that have access to a long running object to maintain the current access to this object while this object performs a re-initialization operation in order to refresh data contained in the object. The system of the invention comprises a long running object manager that controls the re-initialization process of an object registered with the object manager. In operation, a reference program establishes a connection to the long running for purposes of accessing information in the object. This connection to the object is noted in the object manager. At this point, during the connection of the reference to the long running object, there is an event to trigger a re-initialization of the long running object. The object manager notifies the object of the trigger and holds the references that are connected to this object. The object receives the re-initialization signal, performs the re-initialization and sends a reply to the object manager. At this point, the object manager allows the references for the long running object to continue access to the long running object.

27 Claims, 5 Drawing Sheets

METHOD AND SYSTEM TO REINITIALIZE OBJECTS WITHOUT LOSING A REFERENCE CONNECTION

FIELD OF THE INVENTION

The present invention relates to the management of object oriented programs and in particular to a method and system to reinitialize long running object programs and simultaneously maintain reference connections to the objects programs during the re-initialization process.

BACKGROUND OF THE INVENTION

The development of the computer era began in the 1940's. Since that time, computers and computer systems have evolved into extremely sophisticated devices, and computer systems that can be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This concept is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, one can achieve a more stable, uniform, and consistent approach to developing new computer programs.

A central concept in object-oriented programming is the "class." A class is a template that defines a type of object. A class outlines or describes the characteristics or makeup of objects that belong to that class. By defining a class, objects can be created that belong to the class without having to rewrite the entire definition for each new object. This feature of object-oriented programming promotes the reusability of existing object definitions and promotes more efficient use of program code.

Modern object oriented programming languages have features that improve the convenience of programming in those languages. For example, the Java programming language developed by Sun Microsystems has a garbage collection feature that automatically disposes of objects that are no longer used. This automatic garbage collection takes away from the programmer the burden of tracking which objects are used and which are not, and disposing of objects that are no longer used.

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object-oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well-defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

Many of these objects are implemented in programs that are long running processes such as web processes or business transaction processes. These programs exist in environments where many people will access these programs. In these applications programs, the objects can contain information for these long running processes. At some point, the information will become stale and there will be a need to refresh/update the information. However, at the point when it is necessary to refresh this information, it is not known what other processes are using/referencing this information. Presently, if the object began to refresh the information, any processes referencing the object program would lose the connection to the object program. The loss of the connection would result in a processing failure for the referencing program. In addition, the user would then need to repeat the process that they originally followed to find the object and information. To prevent this situation, a system programmer has to put special instructions in place in the program. The insertion of special instructions is a difficult and problematic process. However, without these special instructions the user gets errors in the information.

Therefore, there remains a need for a method that can preserve the reference connections to these objects in long running processes when it is necessary to refresh information contained in these objects. This method would provide accuracy of information in these objects and would address the current problems associated with loss connections resulting from object re-initialization.

SUMMARY OF THE INVENTION

It is an objective of the present invention to provide a method and system that will enable a long running object program to refresh information in that object without losing the connections of applications referencing that object program.

It is a second objective of the present invention to provide a method and system that can preserve the reference programs connected to the long running program during the re-initialization of the long running object.

It is a third objective of the present invention to provide method and system that can capture the state of processes accessing a long running object program at the point the object program begins the re-initialization process, maintain those connections during the re-initialization process, and re-establish the connections at the completion of the re-initialization process.

It is a fourth objective of the present invention to provide a system that can manage the long running object and initiate the re-initialization process for the long running object to ensure accurate information in the object.

It is a fifth objective of the present invention to provide a method that will enable a long running object to interact with an object manager to enable timely re-initialization of the object program.

The system of the present invention comprises an object manager that controls the re-initialization of a long running object program. This object manager has an index of object programs and re-initialization intervals for each object program in the index. The object manager communicates with an object program via a status routine within the object program. This status routine can send information to the object manager and receive instructions from the object manager. The object manager is also in communication with devices that can trigger events the will result in the re-initialization of the long running object program. The triggering event can be initiated by a user or can be internally initiated by the system through devices or programs.

In the method of the present invention, the long running object registers with the object manger. This process enables the object manager to obtain time intervals at which the object should be re-initialized (the information in the long running object is refreshed). In operation, a reference program establishes a connection to a long running object program. In this step, a reference program establishes a connection to the long running for purposes of accessing information in the object. This connection to the object is noted in the object manager. At this point, during the connection of the reference to the long running object, there is an event to trigger a re-initialization of the long running object. This triggering event can be the normal refreshing interval in the object manager, or a user or system trigger. The object manager notifies the object of the trigger. At this point, the references connected to the object program are identified and the object manager places the connections in a hold state. The object receives the re-initialization signal. The object program then performs the object re-initialization. At the completion of the re-initialization, the object program sends a reply to the object manager. At this point, the object manager or the object program allows the references for the long running object to continue access to the long running object.

DETAILED DESCRIPTION OF THE INVENTION

Figure 1:
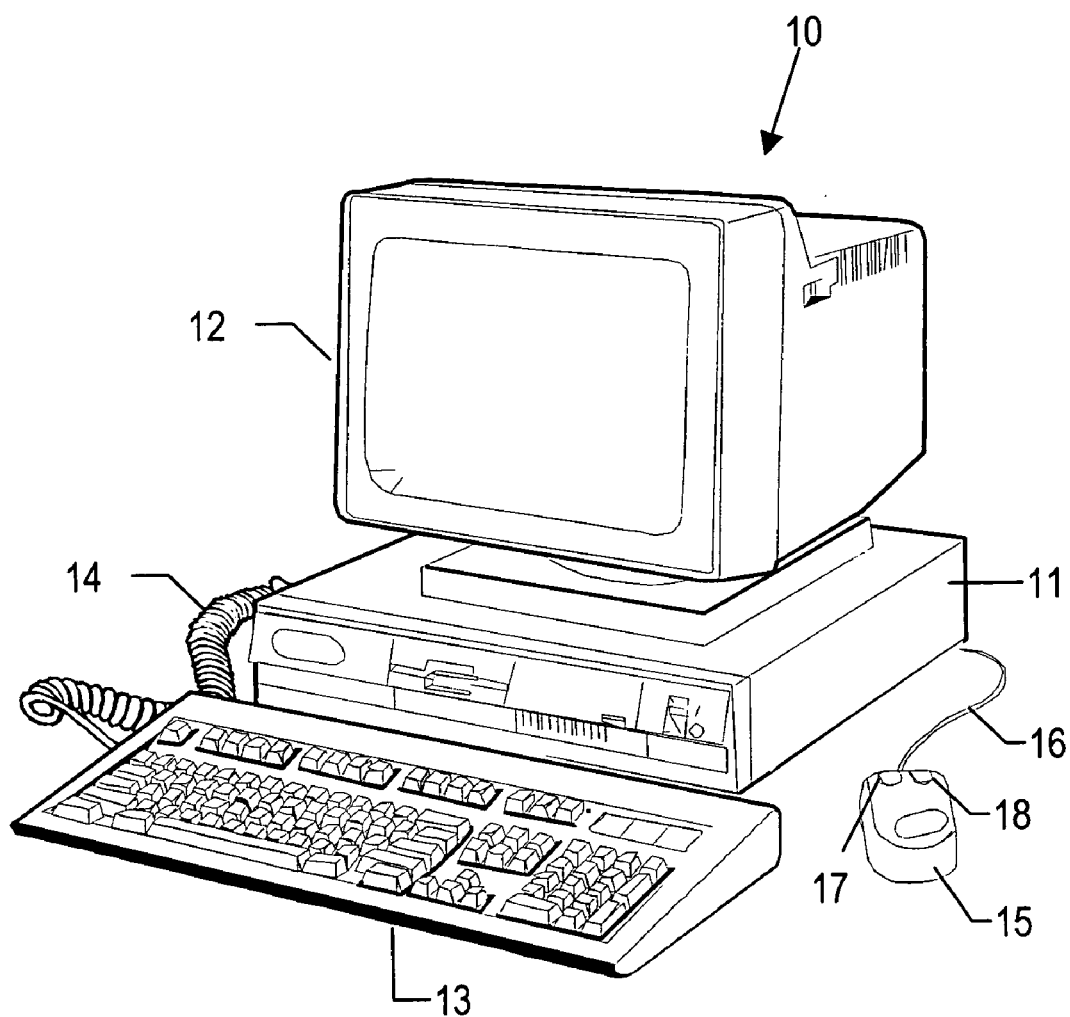
FIG. 1 depicts data processing equipment a system that can be utilized to implement the present invention.

With reference now to FIG. 1, there is depicted a pictorial representation of data processing system 10 which may be used in implementation of the present invention. As may be seen, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

Figure 2:
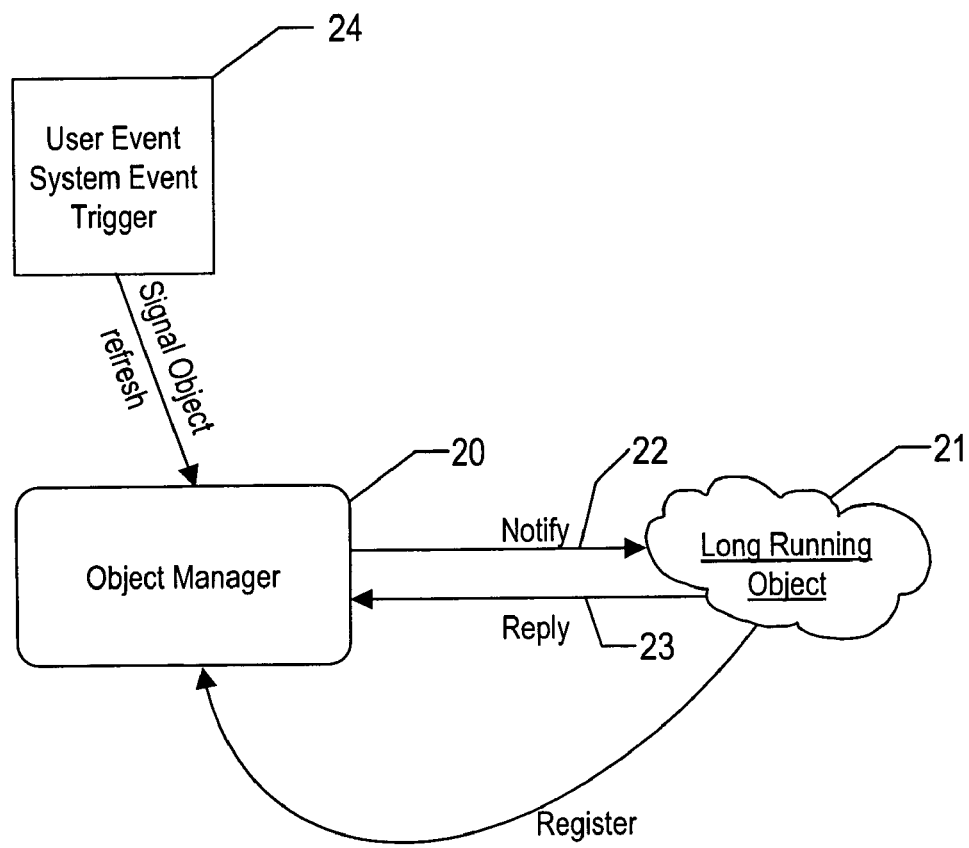
FIG. 2 is a configuration of the components in the system of the present invention.

FIG. 2 is a configuration of the components in the system of the present invention. The central component of the system is the object manager 20. The purpose of this manager is to maintain and control the re-initialization of the long running objects in a system. The object manager is a program that monitors the long running objects, sends re-initialization prompts to the registered objects and monitors connections of reference programs connected to the objects during the re-initialization process. Long running objects are those objects that basically run continuously, but there is a need to update information on a seldom or infrequent basis. In addition, the functions of the object manager can apply to other objects in the system as well. However, there can be many objects in a system that are not long running objects. Generally a programmer has knowledge of which objects in a system have this long running characteristic or requirement. The long running object 21 is a second component of the configuration. Examples of long running objects are programs that contain the postal service zip codes or telephone service area codes. This type of information changes but not constantly. However, when there is a change, there needs to be an update of the information in the object. The objects 21 need to register with the manager 20. This registration informs the object manager of a long running object on the system. Therefore, the object will have information that needs to be refreshed periodically. Within the object manager, there is an index of long running objects and intervals at which the objects should be refreshed (re-initialized). The object manager can receive the information on the refresh interval for a particular object when that object registers with the object manager. The long running object contains interface software that communicates with the object manager. This interface software receives notifications 22 from the object manager, initiates processes internal in the long running object to re-initialize the object and sends replies 23 to the object manager. The third component of the configuration is the event trigger 24. This component can be an automatic triggering event by the system or a triggered event initiated by a user. In the case of a user trigger, the user may know that the information in the long running object is old and therefore, the user can initiate a trigger to the object manager. These asynchronous triggered events are in addition to the periodic refresh intervals. A triggered event can require every object that is affected by that event be refreshed. Some long running objects can in fact reference other long running objects. As a result, the need for one object to be refreshed can require other objects to be refreshed as well. When the object manager receives a trigger event or a notification that the object needs to be refreshed, the object manager notifies the long running object. This notification will cause the object to halt interaction with references in the environment, refresh the information in the object and notify references that the information is again current. This process ensures that other references will not attempt to use the object during the re-initialization process.

In an example of a trigger event, there can be a new zip code added to a city. The long running object will not contain this new zip code. An automatic trigger can cause the long running object to refresh the zip code information and add the new zip code. In this case, the trigger was not from the object manager or a user. As the long running object adds the new zip code, the references to the long running object will halt operations until the refreshing process concludes. The halting process can be analogous to being on hold. In this state, the connection is maintained, however, there is no communication between the parties until the termination of the hold state.

Figure 3:
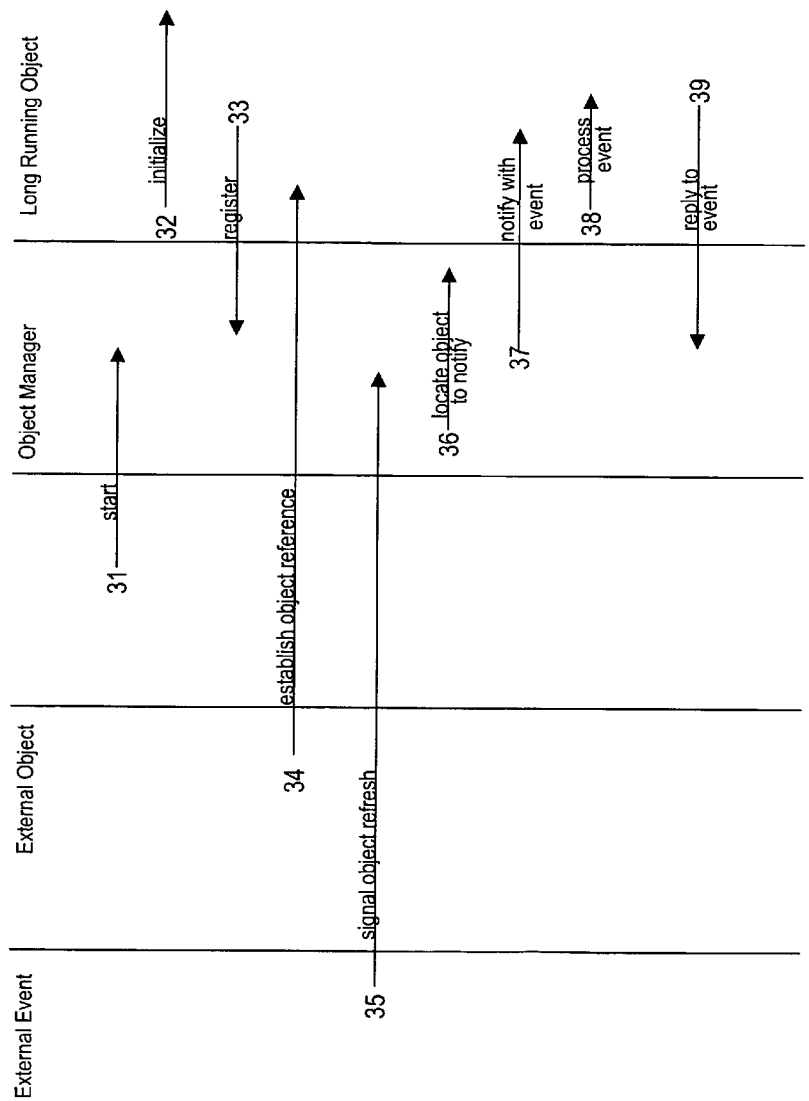
FIG. 3 is a diagram of the different activities that occur in the method of the present invention.

FIG. 3 is an illustration of the different activities that occur during the implementation of the method of the present invention. The activity 31 is the start the object manager utility program. The object manager can be started from external sources. The next step 32 is to initialize a long running object that will have re-initialization capabilities controlled by the object manager. After the initialization of the long running object, step 33 is for the long running object to register with the object manager. The long running object can register with the object manager repeatedly without affecting the status of the long running object. At this point, the long running object has been initialized and registered with the object manager. The long running object can now be accessed by external references such as system users in step 34. As shown, a system user can access the long running object.

Steps 31, 32, 33 and 34 can be viewed as preliminary or phase 1 steps in the process. Step 35 is the case when an external event sends a signal to refresh the information in the long running object. The signal goes to the object manager to inform the manager that there is a need to refresh the information in the long running object. In step 36, the object manager first locates the particular object identified in the refresh signal. The object manager then notifies that long running object to begin the re-initialization process in step 37. There can be several objects that require refreshing and the object manager tells the necessary objects which need to refresh. The interface software within the object receives the notification from the object manager and starts the internal processes to re-initialize the object. Step 38 performs the actual re-initialization of the object. As part of this process, basically, snapshot of the references that have access to the long running object are taken before the start of the re-initialization. These references are then basically put on hold in that the connection to the object is maintained, but there is no interaction between any reference and the object during the initialization. The object manager also obtains an object status for that object. At the completion of the re-initialization, in step 39, the interface software sends signal to the object manager. The references that had access to the long running object now have the access to these objects restored to the point prior to the re-initialization without the need to perform any type of operation to restore the access.

Figure 4:
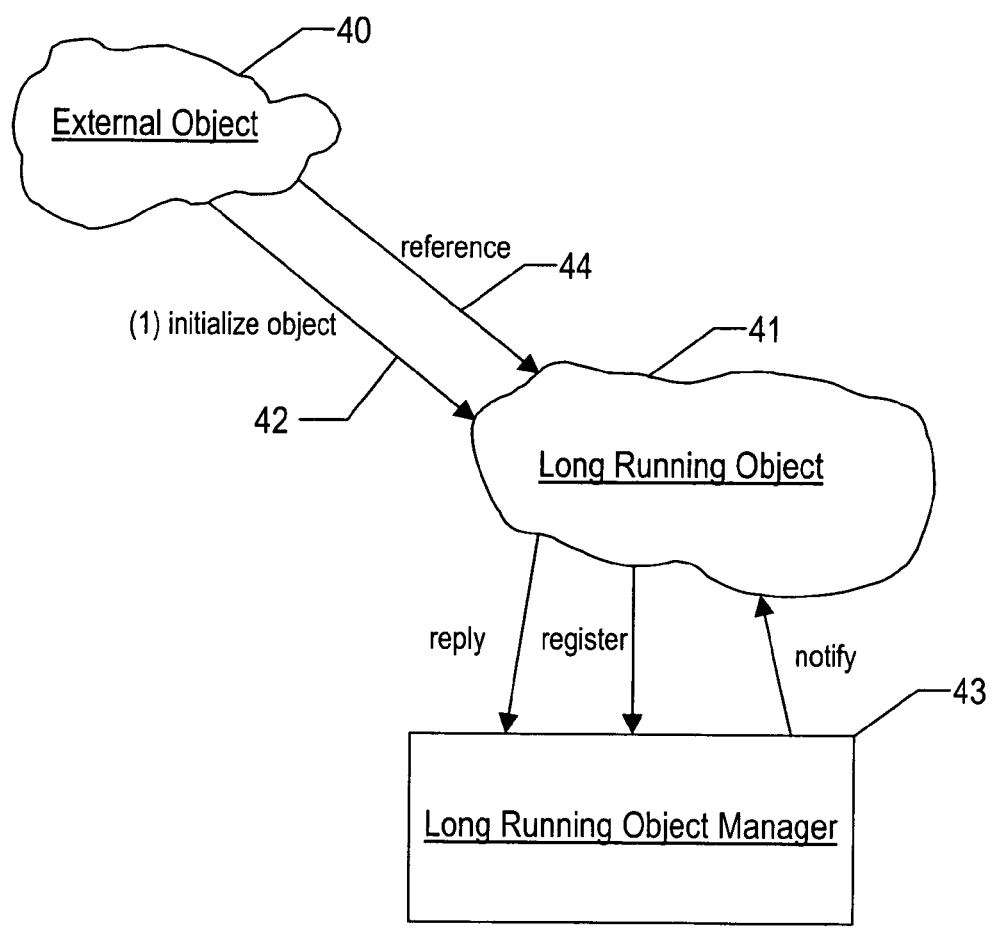
FIG. 4 is an illustration of the communication between the components that comprise the system of the present invention.

Referring to FIG. 4, there is an illustration of the communication between the components that comprise the system of the present invention. Shown is an external object 40 having communication with the long running object 41. Arrow 42 from the external object can initialize or create a long running object. As previously mentioned, an external object can also have references 44 to a long running object. As shown, the long running object also has communications with the object manager 43. The object manager sends notifications to the long running object to perform a refresh operation. The long running objects send registration signals and reply signals to the object manager.

Figure 5:
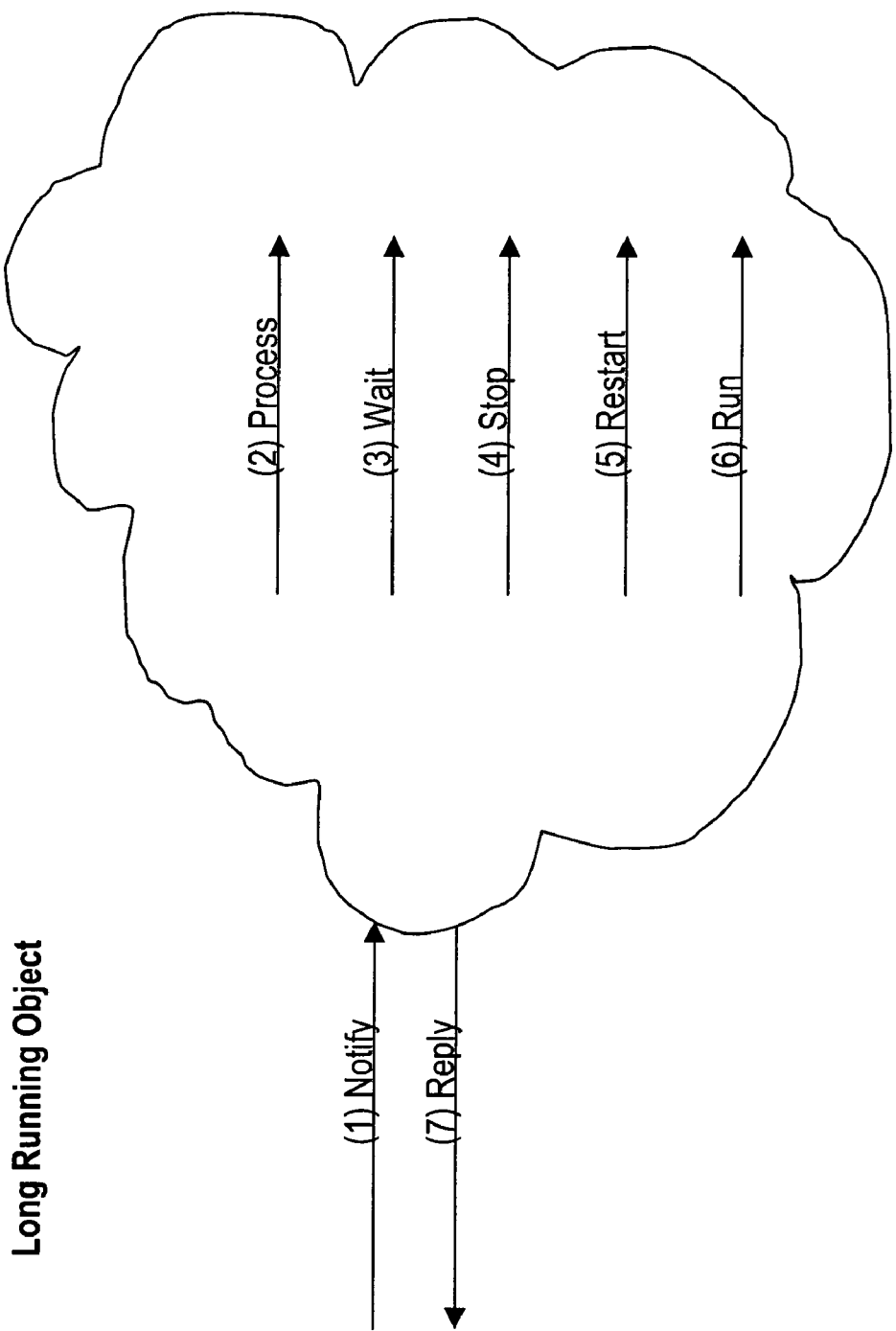
FIG. 5 is an illustration of the communication between the long running object and the object manager.

FIG. 5 illustrates the statuses of the long running object that can be communicated to the object manager. These statuses are related to and implemented in steps 37 and 38 of FIG. 3. When there is a notification of an event, the long running object sends a status to the object manager. The status could be activities such as processing, waiting, stopping, restarting or running. The object program will notify the object manager of the status. This notification can be periodic or on inquiry from the object manager. At the completion of an operation, a signal can be sent to the object manager that the current activity is complete. The wait state will prevent any new reference from gaining access to the object until the object is back in a running state. It is important for the object manager to know the status of each long running object for which the object manager has control. With this status information, the object manger can coordinate activities related to a registered long running object program.

It is also important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. The computer readable medium includes storage medium, paper, and transmission-type of media. Examples of computer readable storage medium include media such as EPROM, ROM, tape, floppy disc, hard disk drive, RAM, and CD-ROM and transmission-type of media, such as digital and analog communications links.

Having thus described the invention, what we claims as new and desire to secure by Letters Patent is set forth in the following claims:

1. A method for re-initializing long running objects in a computing environment while simultaneously maintaining the access of reference applications to the objects during the re-initialization process comprising the steps of:
   registering an object running in a computing environment with an object manager;
   receiving a re-initialization signal to refresh information contained in an object;
   notifying the particular object for which the re-initialization signal was sent; and
   identifying all reference programs that have access to the object at the time of the re-initialization signal;
   placing each identified reference program connected to the object program to be re-initialized in a hold state during the re-initialization process, the hold state providing the capability to maintain the connection of the references to the object program;
   performing the object re-initialization;
   notifying the object manager at the completion of the re-initialization process; and
   removing each identified reference programs from the hold state.

2. The method as described in claim 1 wherein the object is a long running object.

3. The method as described in claim 1 wherein said registering step further comprises:
   receiving at an object manager, a registration request from an object;
   obtaining information concerning the re-initialization interval for that object; and
   listing that object and the re-initialization information in the object manager.

4. The method as described in claim 1 wherein a re-initialization signal could originate from an external source or from the object manager.

5. The method as described in claim 1 wherein said object identification step further comprises the step of identifying object programs that are connected to the particular object program that is to be re-initialized and determining whether each identified object program needs to be re-initialized.

6. The method as described in claim 1 further comprising the step of obtaining the current status at the object manager of an object program for which the object manager has control.

7. The method as described in claim 6 wherein said current status comprises the of processing, waiting, stopping, restarting and running.

8. A computer program product in a computer readable storage medium for re-initializing long running objects in a computing environment while simultaneously maintaining the access of reference applications to the objects during the re-initialization process comprising:
   instructions for registering an object with an object manager; instructions for receiving a re-initialization signal to refresh information contained in an object;
   instructions for notifying the particular object for which the re-initialization signal was sent; and
   instructions for identifying all reference programs that have access to the object at the time of the re-initialization signal;
   instructions for placing each identified reference programs connected to the object program to be re-initialized in a hold state during the re-initialization process, the hold state providing the capability to maintain the connection of the references to the object program;
   instructions for performing the object re-initialization;
   instructions for notifying the object manager at the completion of the re-initialization process; and
   instructions for removing each identified reference programs from the hold state.

9. The computer program product as described in claim 8 wherein said registering instructions further comprise:
   instructions for receiving at an object manager, a registration request from an object;
   instructions for obtaining information concerning the re-initialization interval for that object; and
   instructions for listing that object and the re-initialization information in the object manager.

10. The computer program product as described in claim 8 further comprises instructions for identifying object programs that are connected to the particular object program that is to be re-initialized and instructions for determining whether each identified object program needs to be re-initialized.

11. The computer program product as described in claim 8 further comprising instructions for obtaining the current status at the object manager of an object for which the object manager has control.

12. A method for managing the re-initialization of long running objects in a computing environment while simultaneously maintaining the access of reference applications to the objects during the re-initialization process comprising the steps of:
   registering an object program executing in a computing environment with an object manager;
   monitoring the object programs registered with the object manager;
   notifying a particular object program of a re-initialization signal received at the object manger, the signal indicating the need for the object program begins re-initialization procedures;
   identifying reference programs that are connected to the object at the time of the receipt of the re-initialization signal;
   placing the identified reference programs in a hold state during the re-initialization process; and
   receiving a completion status at the object manager at the completion of the object program re-initialization.

13. The method as described in claim 12 further comprising the step of releasing the references programs from the hold state at the completion of the object program re-initialization.

14. The method as described in claim 12 wherein said registering step further comprises: receiving at an object manager, a registration request from an object;
   obtaining information concerning the re-initialization interval for that object; and
   listing that object and the re-initialization information in the object manager.

15. The method as described in claim 12 wherein said object identification step further comprises the step of identifying object programs that are connected to the particular object program that is to be re-initialized and determining whether each identified object program needs to be re-initialized.

16. The method as described in claim 12 further comprising the step of obtaining the current status at the object manager of an object program for which the object manager has control.

17. The method as described in claim 16 wherein said current status comprises the of processing, waiting, stopping, restarting and running.

18. The method as described in claim 17 wherein the object manager prevents new reference programs from accessing a registered object program when the object manager detects a "wait" status from the object program.

19. A computer program product in a computer readable storage medium for managing the re-initialization of long running objects in a computing environment while simultaneously maintaining the access of reference applications to the objects during the re-initialization process comprising:
   instructions for registering an object program with an object manager;
   instructions for monitoring the object programs registered with the object manager;
   instructions for notifying a particular object program of a re-initialization signal received at the object manger, the signal indicating the need for the object program begins re-initialization procedures;
   instructions for identifying reference programs that are connected to the object at the time of the receipt of the re-initialization signal;
   instructions for placing the identified reference programs in a hold state during the re-initialization process; and
   instructions for receiving a completion status at the object manager at the completion of the object program re-initialization.

20. The computer program product as described in claim 19 further comprising instructions for releasing the references programs from the hold state at the completion of the object program re-initialization.

21. The computer program product as described in claim 19 wherein said registering instructions further comprise:
   instructions for receiving at an object manager, a registration request from an object;
   instructions for obtaining information concerning the re-initialization interval for that object; and
   instructions for listing that object and the re-initialization information in the object manager.

22. The computer program product as described in claim 19 wherein said object identification instructions further comprise instructions for identifying object programs that are connected to the particular object program that is to be re-initialized and determining whether each identified object program needs to be re-initialized.

23. The computer program product as described in claim 22 further comprising instructions for placing each identified reference connected to the object program to be re-initialized in a hold state during the re-initialization process, the hold state providing the capability to maintain the connection of the references to the object program.

24. The computer program product as described in claim 19 further comprising instructions for obtaining the current status at the object manager of an object program for which the object manager has control.

25. The computer program product as described in claim 24 further comprising instructions for the object manager prevent new reference programs from accessing a registered object program when the object manager detects a "wait" status from the registered object program.

26. A system for re-initializing long running objects while simultaneously maintaining the access of reference applications to the objects during the re-initialization process comprising:
   an object manager for controlling the re-initialization of the object, said object manager containing information related to the periodic internals at which an object registered with said object manager is to be re-initialized;
   an object program containing information for access by users, said object being registered with the object manager;
   an object status program contained in said object to facilitate communication between the object manager and the object, said status program capable for notifying the object manager of the status of the objects capable of limiting access of reference applications to the object program during a re-initialization process of the object, and maintain the access of the references programs to an object during the re-initialization of the object by placing the reference programs in a hold state.

27. The system as described in claim 26 wherein said object status comprises the of processing, waiting, stopping, restarting and running.

* * * * *